United States Patent Office.

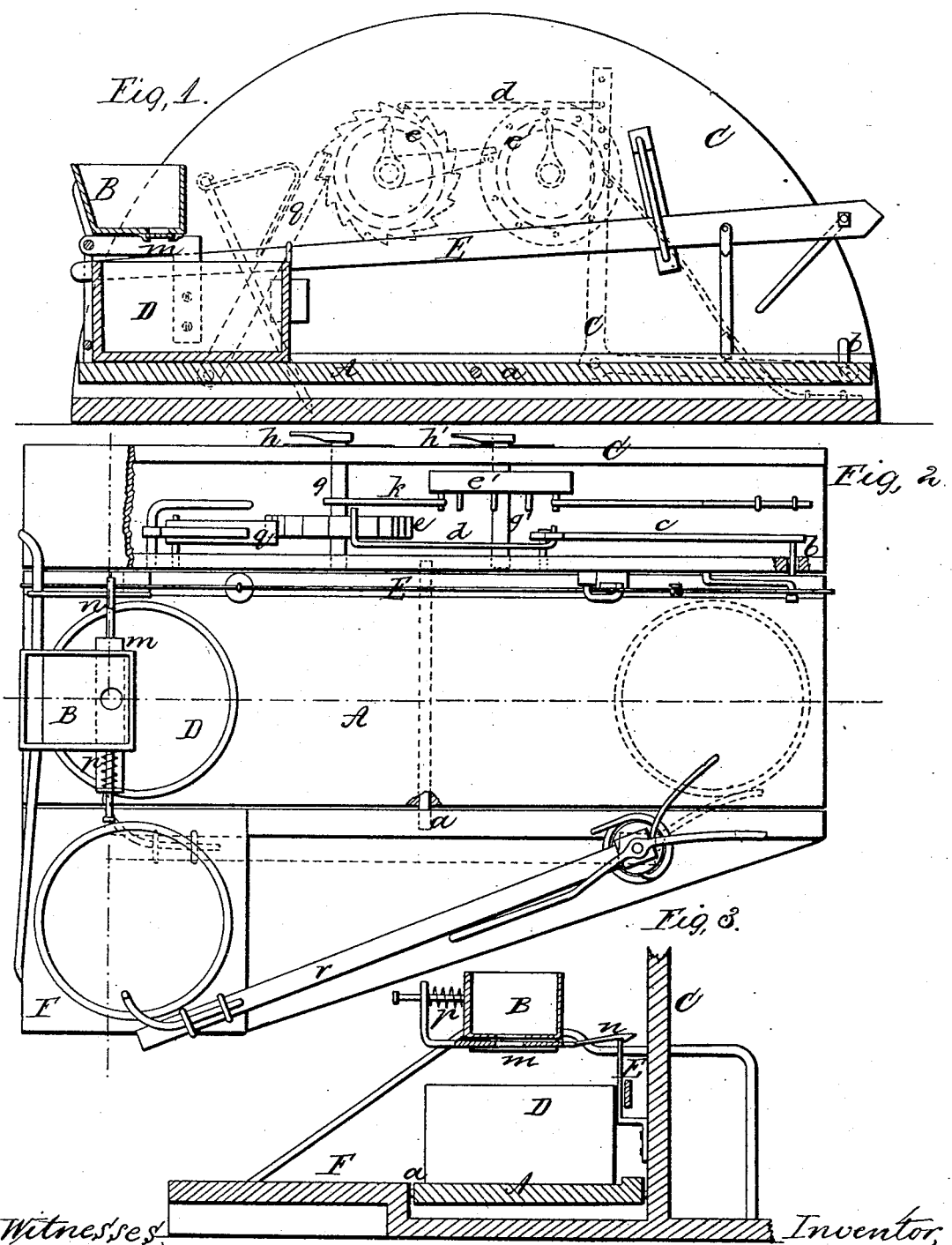

WILLIAM H. PFRIMMER, OF LANESVILLE, INDIANA.

Letters Patent No. 77,521, dated May 5, 1868.

IMPROVEMENT IN MEASURING AND REGISTERING GRAIN.

The Schedule referred to in these Letters Patent and making part of the same.

TO ALL WHOM IT MAY CONCERN:

Be it known that I, WILLIAM H. PFRIMMER, of Lanesville, in the county of Morrison, and State of Indiana, have invented a new and improved Grain-Measuring Register; and I do hereby declare that the following is a full, clear, and exact description thereof, which will enable others skilled in the art to make and use the same, reference being had to the accompanying drawings, forming part of this specification.

Figure 1 represents a sectional side elevation of my improved grain-measuring register.

Figure 2 is a top view or plan.

Figure 3 is a cross-section, taken in the line $x$ $x$, fig. 2.

Similar letters of reference indicate corresponding parts.

The object of this invention is to keep an accurate record of the quantity of grain measured or weighed, by means of a self-registering apparatus, whereby disputes, which often occur in the delivery of grain, between farmers and dealers, are prevented or avoided.

This improvement consists in a device, connected with a weighing-scale, for marking the number of bushels or other quantity weighed, on a dial-plate, which keeps the register every time a certain quantity is weighed or measured.

A is a weighing-platform, hung in the middle on a pivot, $a$, over one end of which is placed a grain-hopper, B, for receiving the grain from a threshing-machine, elevator, bin, &c.

The opposite end of the platform A is provided, on one side, with a projecting pin, $b$, that catches against a bent lever, $c$, enclosed in a case, C, which lever works a pawl, $d$, to rotate a wheel, $e$, hung on a shaft, $g$, on which is a pointer, $h$, of a dial-plate, marked with numbers, for recording the quantity of grain measured.

The shaft $g$ carries an arm, $k$, that catches on teeth around the periphery of a wheel, $e'$, on a shaft, $g'$, that carries the pointer $h'$ of a dial, indicating a higher set of numbers in talleys or scores.

A measure, D, is set upon the end of the platform A, under the hopper B, and the scale-beam E is adjusted to weigh the amount of grain required.

The scale-beam being down, the front end of the platform is elevated; the discharging-valve $m$ in the hopper is then opened, and a projecting spring, $n$, catches over the scale-beam, and holds the valve open while the grain is filling the measure. As soon as the proper weight is in the measure, the scale-beam rises and trips the catch-spring $n$, so that the discharge-valve closes, being drawn back to its seat by a spiral spring, $p$.

The front end of the platform A, under the measure, is depressed, and the other end rises, which operates the pointers on the dials, by means of the pawl $d$ on the wheel $e$, and they record the measure. The pointers are prevented from moving backwards by a dog, $q$, that engages the teeth in the wheel $e$, and thus the account of the grain measured is accurately recorded.

Two measures are used, one of which is placed on a side stationary platform, F, while the grain is measured, and is moved forward by a spring-sweep, $r$, when the filled measure is removed by pushing it over the platform A, which again tilts, and the operation of measuring is repeated.

Having thus described my invention, what I claim as new, and desire to secure by Letters Patent, is—

The tilting-platform A, in combination with the scale-beam E, the hopper B, and the recording-apparatus of the dials, the whole constructed, arranged, and operating substantially as and for the purpose herein described.

WILLIAM H. PFRIMMER.

Witnesses:
FRANCIS M. SANDS,
MICHEAL GEHLBACH.